United States Patent [19]

Tsividis

[11] 4,384,217

[45] May 17, 1983

[54] TEMPERATURE STABILIZED VOLTAGE REFERENCE CIRCUIT

[75] Inventor: Yannis Tsividis, New York, N.Y.

[73] Assignee: Bell Telephone Laboratories, Incorporated, Murray Hill, N.J.

[21] Appl. No.: 262,461

[22] Filed: May 11, 1981

[51] Int. Cl.[3] .......................... H02J 1/04; G05F 1/46; G05F 1/58

[52] U.S. Cl. .................................... 307/297; 307/310; 323/313; 323/316

[58] Field of Search ........................ 307/297, 304, 310; 323/312, 313, 315, 316

[56] References Cited

U.S. PATENT DOCUMENTS

| | | | |
|---|---|---|---|
| 4,088,941 | 5/1978 | Wheatley, Jr. | 323/313 X |
| 4,295,089 | 10/1981 | Cooperman | 323/313 X |
| 4,325,017 | 4/1982 | Schade, Jr. | 323/315 X |

FOREIGN PATENT DOCUMENTS

| | | | |
|---|---|---|---|
| 14149 | 8/1980 | European Pat. Off. | 323/313 |

OTHER PUBLICATIONS

Dobratz, "Linear Differential Temperature Sensor is Accurate and Simple"; *Electronic Design*; pp. 116 & 118; 10/24/1968.

Analysis and Design of Analog Integrated Circuits, Paul R. Gray and Robert G. Meyer, pp. 248–261.

*Primary Examiner*—Larry N. Anagnos

*Attorney, Agent, or Firm*—David I. Caplan

[57] ABSTRACT

Each of a pair of PN junction diodes ($D_1$; $D_2$) is separately dynamically biased by a different clocked current source arrangement ($C_1$, $M_2$; $C_2$, $M_5$). The resulting diode voltage drops ($V_1$ and $V_2$) are fed through a weighted difference amplifier (A; $C_3$, $C_4$, $C_5$, $C_6$) to produce a voltage reference $V_{OUT}$ which is relatively insensitive to temperature variations of the semiconductor body in which the PN junction diodes are integrated.

7 Claims, 1 Drawing Figure

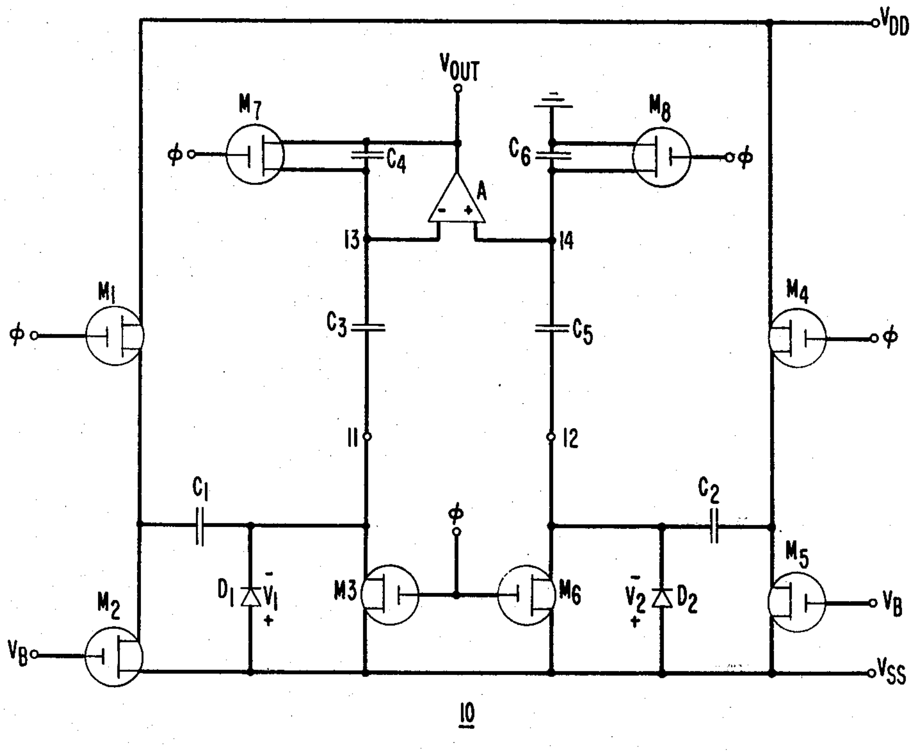
10

TEMPERATURE STABILIZED VOLTAGE REFERENCE CIRCUIT

FIELD OF THE INVENTION

This invention relates to the field of semiconductor apparatus, and more particularly to MOS (metal oxide semiconductor) voltage reference circuits.

BACKGROUND OF THE INVENTION

Semiconductor integrated circuits often require a voltage supply circuit or voltage "reference" for providing a predetermined voltage level. The voltage level provided by such a reference circuit undesirably tends to fluctuate during operation because of temperature variations in the underlying semiconductor body in which the circuit is integrated. However, in the semiconductor art of analog-to-digital and digital-to-analog converter circuits, for example, a voltage reference is desirable which does not fluctuate in voltage level by more than typically about 0.005 volts or less. Therefore, steps must be taken to stabilize the reference circuit against temperature fluctuations.

In order to obtain a stable reference in either bipolar or complementary MOS (C-MOS) technology, the industry generally uses voltage references utilizing either the voltages associated with reverse breakdown phenomena in Zener diodes or the voltages provided by bandgap reference circuits. Such bandgap reference circuits are described, for example, in *Analysis and Design of Analog Integrated Circuits,* Paul R. Gray and Robert G. Meyer, at pp. 248–261. In N-MOS technology, which uses a P-type semiconductor substrate, none of the above mentioned voltage references is feasible. More specifically, Zener diode reverse breakdown cannot easily be used because all PN junctions are designed to withstand the highest possible reverse voltage available on the semiconductor chip in which the circuits are all integrated; hence these junctions cannot readily be driven into reverse breakdown. Moreover, known bandgap reference circuits cannot easily be used since they require constantly forward biased junctions; but, since the P-type substrate in N-MOS integrated circuits is connected to the most negative potential in the system, the requisite constantly forward biased junctions cannot readily occur. Thus, to implement either reverse breakdown Zener or bandgap reference circuits in N-MOS technology would require additional costly fabrication steps, which would impair the economic advantage in N-MOS technology.

It would therefore be desirable to have a voltage reference circuit which can readily be fabricated in N-MOS technology.

SUMMARY OF THE INVENTION

According to the invention, a voltage reference is furnished by the suitably weighted difference amplification of the voltages developed by two junction diodes ($D_1$, $D_2$) each of which is periodically pumped in the forward-bias diode direction by a separate clocked current source. Each such current source advantageously includes a capacitor ($C_1$, $C_2$) which is periodically connected to a charging source and which is permanently connected in series with the corresponding diode and a separate MOS device ($M_2$, $M_5$).

This invention thus involves a voltage reference circuit (10) comprising first and second PN junction diodes ($D_1$; $D_2$), CHARACTERIZED IN THAT each said diode is separately connected to a different clocked current source device ($C_1$, $M_1$, $M_2$, $M_3$; $C_2$, $M_4$, $M_5$, $M_6$) for supplying current in the forward-bias diode direction periodically through the correspondingly diode, each said diode ($D_1$; $D_2$) connected to a separate terminal (11; 12) of a weighted difference amplifier (A, $C_3$, $C_4$, $C_5$, $C_6$) to generate a predetermined weighted difference ($aV_1-bV_2$) of the forward voltage drops ($V_1$; $V_2$) across the diodes ($D_1$; $D_2$). Advantageously, the circuit is FURTHER CHARACTERIZED IN THAT the weighting factors (a, b) of the weighted difference amplifier are substantially in the ratio of:

$$a/b = \frac{V_{xo} - V_2(T_x)}{V_{xo} - V_1(T_x)}$$

where $V_{xo}$ is the linearly extrapolated value of $V_1$ as a function of temperature from a room temperature ($T_x$) to absolute zero; FURTHER CHARACTERIZED IN THAT each clocked current source device comprises separate capacitor ($C_1$, $C_2$), one of the terminals of each of which is separately connected through the high current path of a different MOSFET device ($M_1$; $M_4$) to a first DC voltage source terminal ($V_{DD}$), the gate electrode of each said MOSFET device ($M_1$; $M_4$) being connected to a clocked pulse source terminal ($\phi$); and FURTHER CHARACTERIZED IN THAT each said clocked current source device further comprises another, separate MOSFET device ($M_2$; $M_5$) whose high current path is separately connected between said one plate of each corresponding capacitor ($C_1$; $C_2$) and a second DC source terminal ($V_{SS}$), and still further comprises yet another, separate MOSFET device ($M_3$; $M_6$) whose gate electrode is connected to said clocked pulse source terminal ($\phi$) and whose high current path separately connects the other plate of the capacitor ($C_1$; $C_2$) to said second DC voltage source terminal ($V_{SS}$).

In a specific embodiment of the invention, each of the diodes ($D_1$, $D_2$) is a PN junction semiconductor diode which is periodically pumped by a separate current source supplying suitable current in the forward bias junction direction. Each such current source advantageously supplies the desired current to the corresponding diode by means of the periodic discharge of a clocked capacitor ($C_1$, $C_2$), that is, a capacitor which is periodically charged by the first and second DC voltage sources ($V_{DD}$, $V_{SS}$) and which is allowed periodically to discharge through the corresponding diode. Typically, each diode ($D_1$, $D_2$) is connected in series with an MOS device ($M_2$, $M_5$), such as a MOSFET device to whose gate is applied a fixed bias voltage ($V_B$). The periodic charging of each capacitor ($C_1$ and $C_2$) is typically provided by a pair of separate MOSFET devices ($M_1$, $M_3$ and $M_4$, $M_6$). One of these MOSFET devices ($M_1$, $M_4$) in each pair has its gate electrode connected to a clock pulse source terminal ($\phi$) and has its high current (source-drain) path connecting the first DC voltage source ($V_{DD}$) to one terminal of the capacitor ($C_1$, $C_2$); each of the other of the MOSFET devices ($M_3$, $M_6$) has its gate electrode connected to the clocked pulse source terminal ($\phi$) and its high current path connected between the other terminal of the corresponding capacitor ($C_1$, $C_2$) and ground ($V_{SS}$) the second DC voltage source terminal ($V_{SS}$). The weighted difference amplifier is conveniently provided by an operational amplifier (A) combined with an arrangement of MOS capacitors ($C_3$, $C_4$, $C_5$, $C_6$) for providing weighting factors (a, b) to the amplifier (A). All transistors, including those in the amplifier (A) can be N-MOS devices. In this manner, the circuit of this invention for providing a voltage reference can be integrated, together with the circuit to be supplied with this reference, in a single crystal semiconductive silicon body (same back-gate bias for all transistors), in accordance with the semiconductor integrated circuit art, in particular such as integrated N-MOS technology.

BRIEF DESCRIPTION OF THE DRAWING

This invention together with its features, objects, and advantages can be better understood when read in conjunction with the drawing in which the FIGURE is a schematic circuit diagram of a semiconductor temperature stabilized voltage reference circuit 10 in accordance with a specific embodiment of the invention.

DETAILED DESCRIPTION

As shown in the FIGURE, a voltage reference circuit 10 includes a difference amplifier A with an output terminal at which output $V_{OUT}$ is provided for utilization. This amplifier A can conveniently take the form of an operational difference amplifier in N-MOS technology. The amplifier A has a pair of input terminals labeled + and − to indicate the respective amplification polarities. A first network for controlling a first PN junction diode $D_1$—the first network comprising MOSFET devices $M_1$, $M_2$, and $M_3$, together with a first MOS capacitor $C_1$—delivers its output voltage $(V_{SS}-V_1)$ at node 11; and a second network for controlling a second PN junction diode $D_2$—this second network comprising MOSFET devices $M_4$, $M_5$, and $M_6$, together with a second MOS capacitor $C_2$—delivers its output voltage $(V_{SS}-V_2)$ at node 12. The MOS capacitors $C_3$, $C_4$, $C_5$, and $C_6$ serve as weighting capacitors for weighting the voltages $V_1$ and $V_2$ with input weighting factors a and b in accordance with the relations:

$$V_{OUT}=aV_1-bV_2 \quad (1)$$

with $$a=C_3/C_4 \quad (2)$$

and $$b=C_5(C_3+C_4)/[C_4(C_5+C_6)] \quad (3)$$

where an additive offset voltage is neglected in Eq. (1).

The nodes 11 and 12 thus serve as input terminals for the weighted difference amplifier formed by the amplifier A weighted by the capacitors $C_3$, $C_4$, $C_5$, and $C_6$.

The gate electrodes of transistors $M_1$, $M_3$, $M_4$, and $M_6$ are all connected to a clock pulse voltage terminal $\phi$ which supplies periodic voltage pulses to turn these transistors periodically "on" and "off"; whereas the gate electrodes of transistors $M_2$ and $M_5$ are connected to an intermediate DC voltage bias source $V_B$, of voltage level advantageously lying between voltages $V_{SS}$ and $V_{DD}$. The actual level of $V_B$ is selected to make the transistors $M_2$ and $M_5$ operate as suitable constant current sources whenever their source-drain voltage exceeds a threshold determined by $V_B$, as more fully explained below.

In order to reset the amplifier A, source-drain paths of MOSFETs $M_7$ and $M_8$ are connected in parallel, respectively, with the capacitors $C_4$ and $C_6$. The gate electrodes of $M_7$ and $M_8$ are connected to the clocked voltage source terminal $\phi$. The MOSFETs $M_7$ and $M_8$ thus ensure a periodic discharge of the node 13 between $C_3$ and $C_4$, and the node 14 between $C_5$ and $C_6$.

Each of the diodes $D_1$ and $D_2$ is formed, for example in N-MOS technology, by an N-type localized zone in a P-type semiconductor body. These N-type localized zones of the diodes $D_1$ and $D_2$ can be formed simultaneously with the formation of the source and drain zones of the various (N-channel) MOSFET devices in accordance with standard N-MOS technology; thus, no additional fabrication steps are required for fabricating these diodes $D_1$ and $D_2$. The capacitors $C_1$ and $C_2$ are MOS capacitors advantageously integrated in the semiconductor body together with the diodes $D_1$ and $D_2$ and the MOSFETs $M_1$, $M_2$, . . . $M_6$.

In a typical example in N-MOS implementation, by way of illustration the following approximate values for parameters can be used: $V_{DD}=+5$ V; ground is zero; $V_{SS}=-5$ V; the P-type body (substrate) is connected to $V_{SS}$; the pulse height at the clocked terminal $\phi$ is +10 V with periodicity 10 μs; while the remaining parameters are advantageously selected in accordance with criteria set forth in the APPENDIX below. The dimensions of the transistors $M_1$, $M_3$, $M_4$, $M_6$, $M_7$ and $M_8$—all of which function as "on-off" switches—are selected to be sufficient to enable these transistors to switch with sufficiently small delays consistent with the rate of the clock $\phi$.

During operation, voltages $(V_{SS}-V_1)$ and $(V_{SS}-V_2)$ are developed at nodes 11 and 12, respectively, as a consequence of the periodic charging of the capacitors $C_1$ and $C_2$, respectively, through the transistors $M_1$, $M_3$, and $M_4$, $M_6$, respectively, during the "on" phases of the clock $\phi$. These capacitors periodically are discharged, during the "off" phases of $M_1$ and $M_4$, both through the diodes $D_1$ and $D_2$ and through the devices $M_2$ and $M_5$, respectively, as more fully described below.

During the "on" phases of the clock $\phi$, the capacitors $C_1$ and $C_2$ are both charged to a voltage $(V_{DD}-V_{SS})$ by virtue of the connection of one terminal of each of these capacitors to $V_{SS}$ through the high current (source-to-drain) path of transistors $M_3$ and $M_6$, respectively, and the connection of the other terminal of each of these capacitors to $V_{DD}$ through the high current path of $M_1$ and $M_4$, respectively. In N-MOS technology, the polarity of resulting charge is positive on the left-hand terminal of capacitor $C_1$ and on the right-hand terminal of $C_2$; that is, this polarity is the same as that of $V_{DD}$.

During the "off" phases of the clock $\phi$, the capacitors $C_1$ and $C_2$ slowly discharge and thereby provide forward current to the diodes $D_1$ and $D_2$, respectively. During these discharges, the MOSFETs $M_2$ and $M_5$ will remain in saturation so long as the time intervals $\Delta t_1$ and $\Delta t_2$ are large compared with the duration of each such "off" phase of $\phi$, where $\Delta t_1$ and $\Delta t_2$ are given by:

$$\Delta t_1=(C_1/I_1)(V_{DD}-V_{SS}+V_{TH}-V_B-V_1) \quad (4)$$

$$\Delta t_2=(C_2/I_2)(V_{DD}-V_{SS}+V_{TH}-V_B-V_2) \quad (5)$$

where $I_1$ and $I_2$ are the respective currents through $D_1$ and $D_2$ (equal to currents through $M_2$ and $M_5$), and $V_{TH}$ is the (asumedly equal) threshold voltage of the transistor $M_2$ or $M_5$. These conditions on $\Delta t_1$ and $\Delta t_2$ follow from the fact that each of the transistors $M_2$ and $M_5$ goes below saturation when its drain voltage goes below $V_B-V_{TH}$.

The periodicity of $\phi$ is, of course, dictated in part by the values of $\Delta t_1$ and $\Delta t_2$.

For optimum operation, it is desirable that $M_2$ and $M_5$ remain in saturation during every entire "off" phase of the clock $\phi$, so that $V_1$ and $V_2$ remain substantially constant during every such "off" phase; consequently, the capacitors $C_1$ and $C_2$ should be selected to be sufficiently large that both $\Delta t_1$ and $\Delta t_2$, given by Eqs. (4) and (5) above, are greater than the duration of each such "off" phase of the clock $\phi$, advantageously by a factor of at least 2 or 3. In this way, during every "off" phase, the capacitors $C_1$ and $C_2$ in series with the transistors $M_2$ and $M_5$, respectively, act as sources of constant forward current for the diodes $D_1$ and $D_2$, respectively, that is, constant currents of polarity in the forward biased junction directions of these diodes.

The magnitude of the desired saturation currents $I_1$ and $I_2$ during the "off" phases of the clock $\phi$—that is, during the discharge phases of the capacitors $C_1$ and $C_2$, respectively—will be determined by the respective parameters of the transistors, such as structure sizes (channel length to width ratios), magnitude of $V_B$, doping levels in channels, and source-to-drain voltage drops. As mentioned above, for advantageous operation, both these currents $I_1$ and $I_2$ should be the "saturation" values; that is, the transistors $M_2$ and $M_5$ are operated in their respective saturation regions, where the current is relatively insensitive to drain-to-source voltage fluctuations within operating limits. Thus, during the "off" phases of $\phi$, when the slow discharge of the capacitors $C_1$ and $C_2$ occurs, these capacitors plus the transistors $M_2$ and $M_5$ act as constant current generators for the diodes $D_1$ and $D_2$, respectively.

The corresponding voltages developed across the diodes $D_1$ and $D_2$, i.e., $V_1$ and $V_2$, will be the respective characteristic forward bias voltages of these diodes at their common operating temperature, that is, the temperature of the semiconductor body in which these diodes are integrated. These voltages $V_1$ and $V_2$ are developed only during the "off" phases of $\phi$; and these voltages are sensed by the amplifier A, which thereby produces an output voltage $V_{OUT}$, satisfying the relationship:

$$V_{OUT}=aV_1-bV_2-V_{os} \qquad (6)$$

where $V_{os}$ is the offset voltage which should be added to Eq. (1), and a and b are the weighting factors given by Eqs. 2 and 3 above.

The voltage $V_{OUT}$ is produced only during the "off" phase of the clock $\phi$. During the "on" phase of this clock $\phi$, the capacitors $C_1$ and $C_2$ are both charged to the voltage $V_{DD}-V_{SS}$, while the voltages at nodes 11 and 12 both drop to $V_{SS}$ by virtue of the "on" conditions of transistors $M_3$ and $M_6$. During this "on" phase of the clock $\phi$, the output of the amplifier therefore drops to the amplifier offset value $V_{os}$. Accordingly, for utilization of the output of the amplifier A in cases where a constant, rather than pulsed, reference is desired, a sample and hold circuit means (not shown) can be inserted to control delivery of the output $V_{OUT}$ to the utilization circuit (not shown) for utilizing the voltage reference circuit 10.

If the presence of the offset voltage $V_{os}$ in the output is undesirable, a variety of known offset cancelling schemes can be used, such as charging another capacitor to $V_{os}$ during the "on" phase of the clock $\phi$ and then connecting this capacitor in series between the node 14 and the positive input terminal of the amplifier A.

It is further advantageous that the parameters of the transistors $M_2$ and $M_5$ be selected such that the saturation currents $I_1$ and $I_2$ satisfy:

$$I_1/C_1=I_2/C_2 \qquad (7)$$

In this way, the capacitors $C_1$ and $C_2$ discharge at the same rate, thereby ensuring approximate equality of the drain-to-source voltages of $M_2$ and $M_5$, and at the same time ensuring better tracking of these current sources and hence better efficiency in the development of the voltages $V_1$ and $V_2$. Conveniently, for example, $C_1$ may be selected to be about ten times $C_2$; so that $I_1$ is then about ten times $I_2$, and thus the channel width to length ratio of $M_2$ is then equal to about ten times that of $M_5$. The respective junction areas of diodes $D_1$ and $D_2$ are selected in accordance with criteria discussed in the following APPENDIX.

APPENDIX

For convenience and definiteness, operation of the first diode network ($C_1$, $D_1$, $M_2$) will be considered alone, and then the combined effect of the first and second diode networks ($C_1$, $D_1$, $M_2$; and $C_2$, $D_2$, $M_5$) on the amplifier A will be considered.

The voltage $V_1$ across the diode $D_1$ is a function of temperature, $V_1=V_1(T)$, as is the current $I_1=I_1(T)$ which is delivered by the current source ($C_1$, $M_2$). It is well known that:

$$I_1(T)=G(T)e^{qV_1(T)/kT} \qquad (8)$$

and that:

$$G(T)=H(T)e^{-E_g(T)/kT} \qquad (9)$$

where q is the electron charge, k is Boltzmann's constant, T is the absolute temperature, and $E_g(T)$ is the bandgap energy of the intrinsic semiconductor at temperature T. Ordinarily, H(T) is of the form:

$$H(T)=H_0(T/T_0)^{\beta} \qquad (10)$$

where $H_0$ and $T_0$ are constants, with $H_0$ proportional to the junction area of the diode $D_1$; and $\beta$ is a positive number which is equal to $(4-\alpha)$, where the temperature dependence of the charge carrier mobility in the semiconductor is given by $T^{-\alpha}$, $\alpha$ is ordinarily equal to about 3/2.

On the other hand, it is also true that the bandgap energy $E_g(T)$ varies slowly and almost linearly with temperature T in the neighborhood of T=300° K., so that a good approximation for $E_g(T)$ is given by:

$$E_g(T)=E_{go}-\epsilon T \qquad (11)$$

where $E_{go}$ is about 1.191 eV for semiconductive silicon, and $\epsilon$ is about $2.67\times10^{-4}$ eV/°K. This quantity $E_{go}$ is the extrapolated bandgap energy at absolute zero (T=0° K.); but $E_{go}$ is not equal to the actual bandgap energy at any particular temperature because the approximation of Eq. 11 is valid only in the range in temperature of about 200° K. to 400° K.

Putting Eq. 11 into Eqs. 9 and 8, it is found that:

$$G(T)=H(T)e^{-E_{go}/kT}e^{\epsilon/k} \qquad (12)$$

and $$V_1(T)=V_{go}+(kT/q)\ \ln\ [I_1(T)/e^{\epsilon/k}H(T)] \qquad (13)$$

with $$V_{go}=E_{go}/q.$$

On the other hand, the current supplied by the current source controlled by load MOSFET $M_2$ ordinarily satisfies a temperature dependence given by:

$$I_1(T)=K(T/T_0)^{-\gamma} \qquad (14)$$

where $\gamma$ is a constant, and K is proportional to the channel width-to-length ratio of $M_2$. Thus, putting Eqs. 10 and 14 into Eq. 13, it follows that:

$$V_1(T)=V_{go}+(kT/q)\ \ln\ (BK/T^{\beta+\gamma}) \qquad (15)$$

with $$B=T_0^{\beta+\gamma}/e^{\epsilon/k}H_0.$$

Now, differentiating Eq. 15 with respect to T, the temperature coefficient $C_{x1}$ of $V_1(T)$ evaluated at $T=T_x$=room temperature (300° K.) is:

$$\begin{aligned} C_{x1} &= dV_1(T_x)/dT_x \\ &= (k/q)\ln[BKT_x^{-(\beta+\gamma)}] - (k/q)(\beta+\gamma) \\ &= [V_1(T_x) - V_{go}]/T_x - (k/q)(\beta+\gamma). \end{aligned}$$

Thus:

$$C_{x1}=-[V_{xo}-V_1(T_x)]/T_x \qquad (16)$$

with $$V_{xo}=V_{go}+(kT_x/q)(\beta+\gamma) \qquad (17)$$

For silicon, $V_{xo}$ is about 1.23 volts. It should be again noted that $V_{xo}$ is the linearly extrapolated value of $V_1(T)$ from $T=T_x$ to $T=0°$ K.; that is, $V_{xo}$ is an extrapolation of $V_1(T_x)$ to absolute zero assuming a straight line relationship of $V_1(T)$ vs. T, with slope equal to $C_{x1}$. It should also be noted that $V_{xo}$ will be the same for the diode $D_1$ in the first network ($C_1$, $D_1$, $M_2$) as for the diode $D_2$ in the second network ($C_2$, $D_2$, $M_5$).

Consider a weighted difference of the voltages $V_1(T)$ and $V_2(T)$ to form $V_{OUT}(T)$:

$$V_{OUT}(T)=aV_1(T)-bV_2(T) \qquad (18)$$

For temperature stability of $V_{OUT}(T)$, the temperature derivative of $V_1(T)$ at $T_x$, the room temperature, is to be set equal to zero:

$$a\frac{dV_1}{dT_x} - b\frac{dV_2}{dT_x} = 0 \qquad (19)$$

or:

$$aC_{x1}-bC_{x2}=0 \qquad (20)$$

For convenience, to solve for the desired values of a and b, set the ratio of $V_{OUT}(T_x)$ to $V_{xo}$ equal to h:

$$h=V_{OUT}(T_x)/V_{xo} \qquad (21)$$

Evaluate Eq. (18) at $T=T_x$:

$$hV_{xo}=aV_1(T_x)-bV_2(T_x) \qquad (22)$$

Put Eq. (16) and its equivalent counterpart for $C_{x2}$ into Eq. (19):

$$-a[V_{xo}-V_1(T_x)]/T_x+b[V_{xo}-V_2(T_x)]/T_x=0 \qquad (23)$$

Solving Eqs. (22) and (23) for the desired values of a and b:

$$a = h\frac{V_{xo} - V_2(T_x)}{V_1(T_x) - V_2(T_x)} \qquad (24a)$$

$$b = h\frac{V_{xo} - V_1(T_x)}{V_1(T_x) - V_2(T_x)} \qquad (24b)$$

and hence $$a/b = \frac{V_{xo} - V_2(T_x)}{V_{xo} - V_1(T_x)} \qquad (25)$$

Thus, if it is desired to have a preselected value $V_{OUT}$ at $T_x$: first, calculate $h=V_{OUT}/V_{xo}$; next, select the parameters for the two networks ($C_1$, $D_1$, $M_2$ and $C_2$, $D_2$, $M_5$) such that their room temperature diode voltage drops, $V_1(T_x)$ and $V_2(T_x)$, differ by a convenient nonvanishing value; then, calculate the weighting factors a and b from Eqs. (24*a*) and (24*b*); and finally, select the weighting capacitors $C_3$, $C_4$, $C_5$, and $C_6$ consistently with Eqs. (2) and (3).

It is thus required that $V_1(T_x)$ be different from $V_2(T_x)$, hence the first and second diode networks must be constructed differently in one or more parameters of the diodes $D_1$ and $D_2$; i.e., differing products of BK in Eq. 15 for the two networks should be selected, for example, by selecting differing channel width-to-length ratios of the load transistors $M_2$ and $M_5$, while respective junction areas $A_1$ and $A_2$ of diodes $D_1$ and $D_2$ should be selected in accordance with the above discussions following Eqs. (14), (15), and (10) as more fully considered below.

It is to be noted that the discussion in connection with above Eqs. (8)–(10) yields:

$$V_1(T_x)-V_2(T_x)=(kT_x)\ \ln\ (I_1A_2/I_2A_1) \qquad (26)$$

where $A_1$ and $A_2$ are the junction areas of the diodes $D_1$ and $D_2$, respectively; and $I_1$ and $I_2$ are the diode currents at room temperature $T_x$. The desirability of current tracking of the two diodes and of economy of semiconductor surface area indicates that for $V_1(T_x)>V_2(T_x)$ the ratio $I_1A_2/I_2A_1$ or $(I_1/A_1)/(I_2/A_2)$ should be less than about 100. On the other hand, kT/q is equal to about 0.026 volts at $T=300°$ K., and ln (100) is equal to about 4.6; thus, $V_1(T_x)-V_2(T_x)$ should be less than about $0.026\times4.6=0.12$ volt for a room temperature $T_x=300°$ K. The voltages $V_1(T_x)$ and $V_2(T_x)$ are both equal to about 0.6 volt for conveniently designed diodes in silicon, while $V_{xo}$ is equal to about 1.2 volt. Furthermore, both a and b should be less than about 100, for reasons of reasonable matching and economy of semiconductor area. These considerations impose further, though not too strict, conditions upon the desirable parameters.

As an illustrative example, for a reference $V_{OUT}$ of about 1.2 volt, it is seen from Eq. (21) that h is equal to about unity, so that $V_1(T_x)-V_2(T_x)$ from Eqs. (24) and (25) should be greater than about 0.6/100=0.006 volt, and ln $(I_1A_2/I_2A_1)$ from Eq. (26) should therefore be greater than about 0.006/0.026=0.23; hence $(I_1A_2/I_2A_1)$ or $(I_1/A_1)/(I_2/A_2)$ should be greater than antiln (0.23) or about 1.26 at room temperature $T_x=300°$ K.

Similarly, for a reference $V_{OUT}$ of about 6 volt, h=5; $V_1(T_x)-V_2(T_x)$ should therefore be greater than about $5\times0.6/100=0.030$ volt, and ln $(I_1A_2/I_2A_1)$ greater than about 0.030/0.026=1.16, and hence $(I_1A_2/I_2A_1)$ or $(I_1/A_1)/(I_2/A_2)$ should be greater than about 3.2 at room temperature $T_x=300°$ K.

Although this invention has been described in terms of a specific embodiment, various modification can be made without departing from the scope of the invention. For example, the transistors $M_7$ and $M_8$ can be omitted and other means can optionally be supplied for the reset purpose if desired.

What is claimed is:

1. A voltage reference circuit comprising first and second PN junction diodes ($D_1$; $D_2$), CHARACTERIZED IN THAT each said diode is separately connected to a different clocked current source arrangement ($C_1$, $M_1$, $M_2$, $M_3$; $C_2$, $M_4$, $M_5$, $M_6$) for supplying current in the forward-bias diode direction periodically through the corresponding diode, and each said diode ($D_1$; $D_2$) connected to a separate terminal (11; 12) of a weighted difference amplifier (A, $C_3$, $C_4$, $C_5$, $C_6$) to generate a predetermined weighted difference ($aV_1-bV_2$) of the forward voltage drops ($V_1$; $V_2$) across the diodes ($D_1$; $D_2$).

2. A circuit according to claim 1 FURTHER CHARACTERIZED IN THAT the weighting factors (a, b) of the weighted difference amplifier are substantially in the ratio of:

$$a/b = \frac{V_{xo} - V_2(T_x)}{V_{xo} - V_1(T_x)}$$

where $V_{xo}$ is the linearly extrapolated value of $V_1$, as a function of temperature, from a room temperature $T_x$ to absolute zero.

3. A circuit according to claim 1 or 2 FURTHER CHARACTERIZED IN THAT each clocked current source arrangement comprises a separate capacitor ($C_1$, $C_2$) one of the terminals of each of which is separately connected through the high current path of a different MOSFET device ($M_1$; $M_4$) to a first DC voltage source terminal ($V_{DD}$), the gate electrode of each said MOSFET device ($M_1$; $M_4$) being connected to a clock pulse source (φ), and another of the terminals of each capacitor ($C_1$, $C_2$) is respectively connected to a different one of said diodes ($D_1$, $D_2$).

4. A circuit according to claim 3 FURTHER CHARACTERIZED IN THAT each said clocked current source arrangement further comprises another, separate MOSFET device ($M_2$; $M_5$) whose high current path is separately connected between said one plate of each corresponding capacitor ($C_1$; $C_2$) and a second DC source terminal ($V_{SS}$), and still further comprises yet another, MOSFET device ($M_3$; $M_6$) whose gate electrode is connected to said clocked pulse source (φ) and whose high current path separately connects the other plate of the capacitor ($C_1$; $C_2$) to said second DC source terminal ($V_{SS}$).

5. Semiconductor apparatus comprising:

(a) a weighted difference amplifier having a pair of input terminals (11, 12);

(b) a first network for supplying a first voltage ($V_{SS}-V_1$) to one of said input terminals (11), said network comprising a first PN junction diode ($D_1$) integrated in a semiconductor body and connected in series with a first clocked current arrangement for periodically forward-biasing the diode ($D_1$); and (c) a second network for supplying a second voltage ($V_{SS}-V_2$) to another of said input terminals (12), said second network comprising a second PN junction diode ($D_2$) integrated in said semiconductor body and connected in series with a second clocked current source arrangement for periodically forward-biasing the second diode ($D_2$).

6. Apparatus according to claim 5 in which the first and second clocked current networks are connected to a common clock pulse terminal for supplying clocked pulses to said clocked current arrangements.

7. Apparatus according to claim 5 or 6 in which each said current source arrangement comprises a separate capacitor ($C_1$, $C_2$) in series with a load transistor ($M_2$, $M_5$), each of said capacitors ($C_1$, $C_2$) being connected respectively to a different one of each of said diodes ($D_1$, $D_2$).

* * * * *